(12) United States Patent
Tipton

(10) Patent No.: US 7,434,529 B2
(45) Date of Patent: Oct. 14, 2008

(54) LIVE/BAIT WELL VENTILATION VENT

(76) Inventor: Judy L. Tipton, 2070 Christianburg Rd., Bagdad, KY (US) 40003

( * ) Notice: Subject to any disclaimer, the term of this patent is extended or adjusted under 35 U.S.C. 154(b) by 0 days.

(21) Appl. No.: 11/543,723

(22) Filed: Oct. 5, 2006

(65) Prior Publication Data

US 2007/0186836 A1    Aug. 16, 2007

Related U.S. Application Data

(60) Provisional application No. 60/723,831, filed on Oct. 5, 2005.

(51) Int. Cl.
*B63B 35/14* (2006.01)
(52) U.S. Cl. .......................... 114/255; 43/56
(58) Field of Classification Search ................. 114/255, 114/211; 43/56
See application file for complete search history.

(56) References Cited

U.S. PATENT DOCUMENTS

| | | | |
|---|---|---|---|
| 2,800,741 A | 7/1957 | Adams | |
| 3,367,061 A | 2/1968 | Brandemihl et al. | |
| 4,615,137 A | 10/1986 | Radmanovich | |
| 4,845,886 A | 7/1989 | Robinson | |
| 5,038,515 A | 8/1991 | Moorhead | |
| 5,109,625 A * | 5/1992 | Skrede | 43/56 |
| 5,191,732 A | 3/1993 | Berdinsky et al. | |
| 5,212,902 A | 5/1993 | Moorhead et al. | |
| 5,231,789 A | 8/1993 | Radmanovich | |
| 5,249,388 A | 10/1993 | Crabtree | |
| 5,267,410 A | 12/1993 | Peyatt | |
| 5,275,249 A * | 1/1994 | Nelson | 180/69.2 |
| 5,331,914 A | 7/1994 | Salmons | |
| 5,586,406 A | 12/1996 | Lin et al. | |
| 5,632,220 A | 5/1997 | Vento | |
| 5,634,291 A * | 6/1997 | Pham | 43/57 |
| 6,038,993 A | 3/2000 | Vento | |
| 6,192,820 B1 | 2/2001 | Anderson et al. | |
| 6,354,238 B1 | 3/2002 | Molesworth et al. | |
| 6,729,066 B1 | 5/2004 | Howley | |
| 6,748,695 B2 | 6/2004 | Vento | |

* cited by examiner

*Primary Examiner*—Stephen Avila
(74) *Attorney, Agent, or Firm*—Carrithers Law Office, PLLC; David W. Carrithers

(57) ABSTRACT

A sport or pleasure fishing boat having a closed live well for holding a selected volume of water and a live well ventilation vent unit mounted in a top wall overlying well. The live well vent unit is an open ended elongate sleeve that projects through the wall into the well. There is a partition dividing the interior of the sleeve into first and second separate vertical disposed air flow passages. Baffles extend from the upper end of the partition and overlying a portion of the respective passages exposed to atmosphere. The baffles slope upwardly and outwardly away from the partition and terminate in a free outer edge spaced a selected distance from the adjacently disposed end of the sleeve. The space between the baffle and sleeve defines a crescent shaped opening for the flow of air there through. The free outer edge of the baffle is spaced vertically from the upper end of the sleeve to catch and deflect a current of air into the well above the water therein.

14 Claims, 6 Drawing Sheets

LIVE/BAIT WELL VENTILATION VENT

This application claims priority from U.S. Provisional Application Ser. No. 60/723,831 filed on Oct. 5, 2005 which is incorporated by reference herein in its entirety.

FIELD OF INVENTION

This invention relates generally to fishing boats having live wells for the catch or bait and more particularly to a ventilation vent for fresh air for the live well of a fishing boat with a live well and incorporating the air vent unit.

BACKGROUND OF INVENTION

Fishermen have struggled for year to increase survival rates of their catch. Whether it be to transport live bait to one's fishing destination, bringing home the catch, returning the fish to the same or different water source, or participating in today's popular fishing tournaments, the desire and necessity to keep fish alive has always been important. Clearly, in the last 30 years, there has been much advancement in live or bait wells. With onboard pump/recirculating/aeration systems, the mortality rates of fish have declined. However, the effects on fish being subjected to extreme live or bait well conditions effects of hypothermia, and hyperthermia. Often the conditions in a live well are much warmer than the temperature of the environment, that a fish was caught in. This warmer condition causes stresses to the fish from experiencing the effects of hyperthermia. In this state, fish, which are cold blooded, expend more energy and use more oxygen from the live well water. Some fisherman, to get the effects of warmer well conditions, often add ice to the live well to reduce temperatures, but if too much ice is added fish can then experience the effects of hypothermia. In addition, fish are then experiencing a rapidly changing environment, which leads to increase stress upon the fish.

It is beneficial to keep fish alive in conditions as close as possible to that of the environment they were caught in to survive best in live well conditions. This is the function of the boat live well vent unit disclosed herein.

A search of patents on the subject of venting a live well brought to light the following U.S. Pat. Nos.: 6,038,993: 5,632,220: 5,331,914: 6,729,066B1; 6,354,238 BI; 6,192, 820B1; 5,586,406; 5,212,902; 5,191,732; 5,038,515; 4,615, 137; 5,231,789; 3,367,061; 2,800,741; 5,249,388; 6,748,695 B2; 5,267,410; 4,845,886

These references teach methods and devices for improving live wells and recirculating of fluid therein; however, the references fail to teach or suggest a ventilation vent device for solving the ventilation/temperature control problem in a live well on a boat.

SUMMARY OF THE INVENTION

Typical fishing boats having a closed live well for holding a selected volume of water and a live well ventilation vent unit mounted in a top wall overlying well. The live well vent unit is an open ended elongate sleeve that projects through the wall into the well. There is a partition dividing the interior of the sleeve into first and second separate vertical disposed air flow passages. Baffles extend from the upper end of the partition and overlying a portion of the respective passages exposed to atmosphere. The baffles slope upwardly and outwardly away from the partition and terminate in a free outer edge spaced a selected distance from the adjacently disposed end of the sleeve. The space between the baffle and sleeve defines a crescent shaped opening for the flow of air there through. The free outer edge of the baffle is spaced vertically from the upper end of the sleeve to catch and deflect a current of air into the well above the water therein.

Furthermore, the live well ventilation vent unit for a boat comprises an open ended sleeve, a partition dividing the interior into first and second separate air flow passages through the sleeve, baffle means extending from the partition and overlying a portion of the respective passages. The baffle means slopes upwardly and outwardly away from the partition and terminates in a free outer edge spaced a selected distance from the adjacently disposed end of the sleeve. Moreover the live well ventilation vent unit can incorporate a mounting flange projecting outwardly beyond the outer perimeter of the sleeve. The sleeve can be circular and the space between the baffle and interior of the sleeve can define a crescent shaped air flow through opening in each of the air flow passages.

More particularly, the instant invention provides a fishing boat having a live well for holding a selected volume of water, a cover over the well separating the same from atmosphere and a live well ventilation vent unit comprising an open ended elongate sleeve mounted on the wall and projecting there through. The sleeve is disposed vertically. A partition divides the interior of the sleeve into first and second separate vertical air flow passages. A baffle means extends from the partition and overlying a portion of the respective passages exposed to atmosphere. The baffle means slopes upwardly and outwardly away from the partition and terminating in a free outer edge spaced a selected distance from the adjacently disposed end of the sleeve defining a butterfly vent.

Applicants vent unit is designed to allow stagnant, heated air to be released from the live well, while fishing, thereby keeping the well environment close to the day's ambient and water temperatures. The air ventilation vent unit is designed so that when traveling. air is forced there through creating a forced circulation of air resulting in a gradual decrease of the live well water temperature, and thereby increasing the dissolved oxygen levels of the water. The ventilation vent unit functions to create a more stable live well environment.

The live well ventilation vent unit of the present invention is intended for use in fish holding containment, including but not limited to live wells, bait wells, aquariums, etc. The vent unit has multiple functions. The open area of the vent unit creates air flow passages to allow heat to escape from the fish holding containment as fresh cooler air is pulled therein. The ventilation vent unit creates a venturi effect when any level of air/wind, from any direction travels over the unit whether it be from natural air current flows or induced for example by boat travel. The vent unit captures and forces air/wind down into the holding compartment through one air passage and releases the air/wind out through the other air vent passage. The air vent prohibits splashing water from escaping from the fish holding containment through redirection of same back into the live well. The vent unit expels stagnant air and releases the trapped air thereby lowering the temperature of the live well compartment and the temperature of the water in such compartment. It functions to increase dissolved oxygen levels in the water held within the holding containment. The vent unit strives to stabilize the holding containment with the environmental conditions resulting in reduced fish stress and thereby increasing fish survival rates. Factors that enhance or decrease performance of the vent unit include environmental factors such as time of the day; daytime temperature; night temperature; wind velocity; wind direction, time of year; lake water temperature; dissolved oxygen level of lake water; water turbidity etc as well as other factors such as the size of fish holding containment; volume of water held within the live well; sophistication of existing aeration systems; frequency of aeration use, sophistication of water pumping and exchange systems; number(s) of fish being held; boat hull design; boat construction material i.e. fiberglass, aluminum; frequency of boat running; speeds of boat running; use of live well/bait well support additives; use of ice to cool fish holding containment, and time of use etc One preferred embodiment of the live well vent unit for a boat comprises an open ended sleeve, a partition dividing the interior into first and second separate air flow passages through the sleeve with baffle means extending from the partition and overlying a portion of said respective passages. The baffle means slopes upwardly and outwardly away from the partition and terminates in a free outer edge spaced a selected distance from the adjacently disposed end of the sleeve. The sleeve can have a mounting flange projecting outwardly beyond the outer perimeter of the sleeve. The sleeve is circular and wherein the space between the baffle and interior of the sleeve defines a crescent shaped air flow through opening in each of the air flow passages.

The construction design of the vent creates a natural interface between atmospheric air and livewell/baitwell water to accomplish the following:

1) The vent increases dissolved oxygen in livewell/bait well water by atmospheric diffusion, augmented surface diffusion, and natural cooling processes;

2) The vent controls livewell/bait well air and water temperatures by the processes of evaporation, evaporative cooling, conduction, and convection; based on Newtons Law of cooling; and 3) The vent controls metabolic and gas waste buildup in livewell/baitwell by means of air stripping and vacuum degassing to eliminate supersaturation of waste and gasses.

Thus, It is an object of the present invention to provide a one piece ventilation vent which can be inexpensively molded for use in fish holding containment such as live wells, bait wells, aquariums and the like.

It is an object of the present invention to provide means for heat to escape from the fish holding containment.

It is an object of the present invention to provide a product which creates a venturi effect when any level of air/wind, from any direction travels over the vent.

It is an object of the present invention to provide a ventilation vent which captures and forces air/wind down into the holding compartment through the front louver and release the air/wind out through a rear louver contiguous to the front louver but oriented in opposite directions and separate from one another.

It is another object of the present invention to prohibit water from escaping from the fish holding containment through the vent.

It is an object of the present invention to intake fresh air and exchange same with stale air.

It is an object of the present invention to release trapped heat.

It is an object of the present invention to lower the temperature of water held within the holding containment.

It is an object of the present invention to increase the dissolved oxygen level in the water held within the holding compartment.

It is an object of the present invention to stabilize the holding containment to ambient environmental temperatures.

It is an object of the present invention to provide a ventilation vent composed of a moldable material, contains no moving pieces and requires no mechanically powered air or water circulation system to operate other than movement of the air and/or boat.

It is yet another object of the present invention to reduce fish stress and increase fish survival rates.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF PREFERRED EMBODIMENT

Figure 1:
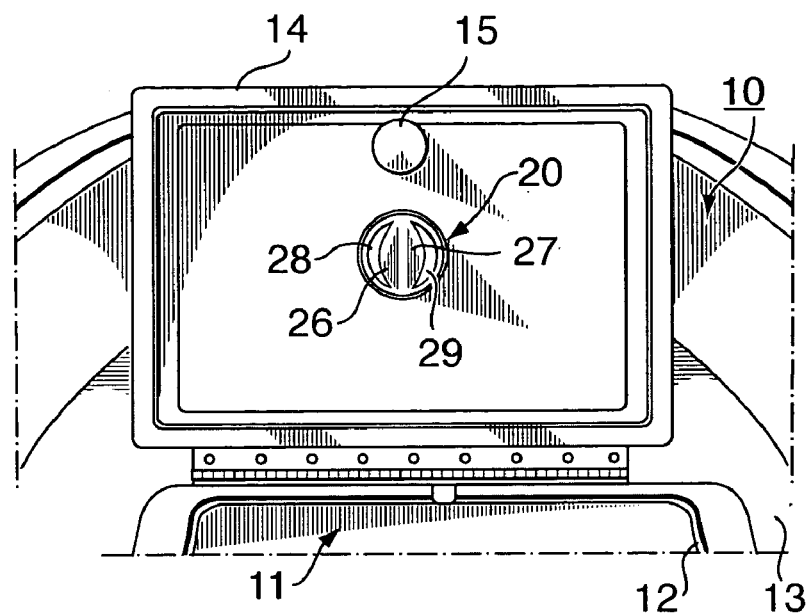
FIG. 1 is a perspective view of a portion of a boat with a live well provided with a fresh air ventilation vent unit in accordance with the present invention.
Figure 2:
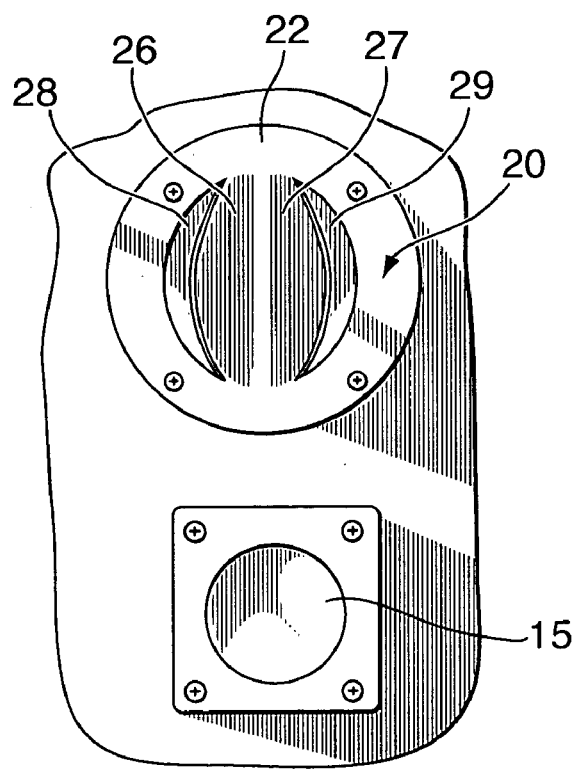
FIG. 2 is a top plan view of a portion of FIG. 1 showing the ventilation vent with the hinged well cover in a closed position.
Figure 3:
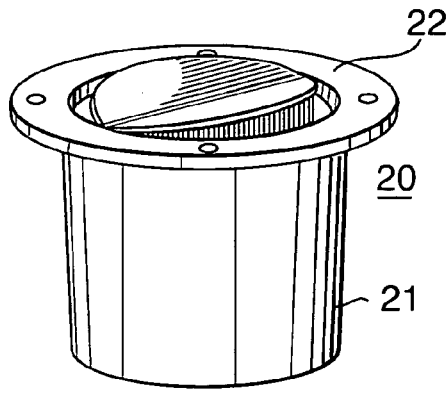
FIG. 3 is an oblique view of the ventilation vent unit.
Figure 4:
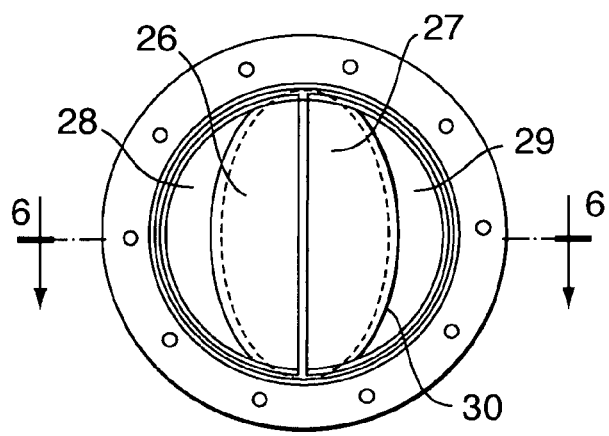
FIG. 4 is a top plan view of the ventilation vent unit.
Figure 5:
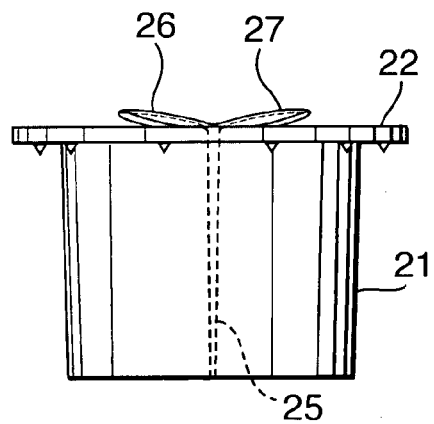
FIG. 5 is an elevational view of the ventilation vent unit.

As illustrated in the drawings, a portion of a fishing boat 10 is shown having a live well 11 accessible though an opening 12 in the boat deck 13. A lid 14 is hingedly mounted on the deck 13 selectively to cover and uncover the opening 12. The lid has a finger grip pull unit 15 all of which are conventional elements known in the art.

In accordance with the present invention the live well is provide with an air ventilation vent unit 20 which in this instance is mounted on the lid 14. If desired it could be mounted anywhere in a portion of the deck 13 closing the upper part of the live well.

The unit 20 comprises an annular sleeve 21 with a mounting flange 22 extending radially outwardly from one end thereof defining a butterfly shaped vent unit. The flange has suitably positioned holes for fasteners to securely mount the unit in the lid 14 with the sleeve projecting through a hole in the lid and downwardly into the upper part of the live well when the lid 14 is in its closed position.

Figure 6:
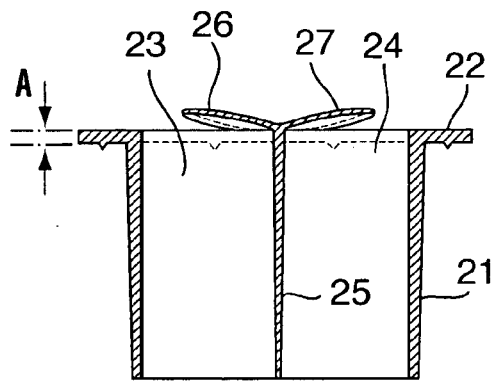
FIG. 6 is a sectional view taken along line 6-6 off FIG. 4 showing the ventilation vent unit of the present invention.

The sleeve 21 internally is divided into air flow through passages 23, 24 by a partition 25. The partition has a pair of baffles 26, 27 secured thereto at the upper end thereof. The baffles 26, 27 partially overlie the respective passages leaving a crescent or quarter moon shaped openings 28, 29 for flow of air through respective passages 23, 24. The baffles 26, 27 diverge upwardly away from the partition and have a curved outer edge 30 that at its highest point is spaced a selected distance above the plane of the upper surface of the flange 22 this distance being designated A in FIG. 6. This spacing in one preferred embodiment unit was 0.142 inches and provided satisfactory results.

Figure 7:
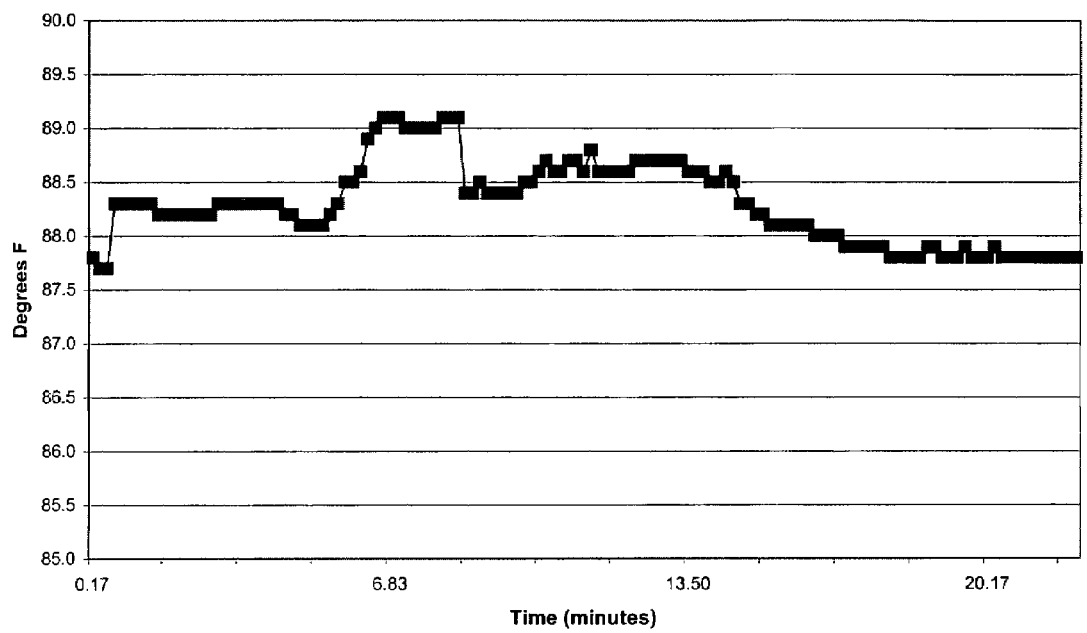
FIG. 7 is a chart of the live well without the vent water temperature over a period of time.
Figure 8:
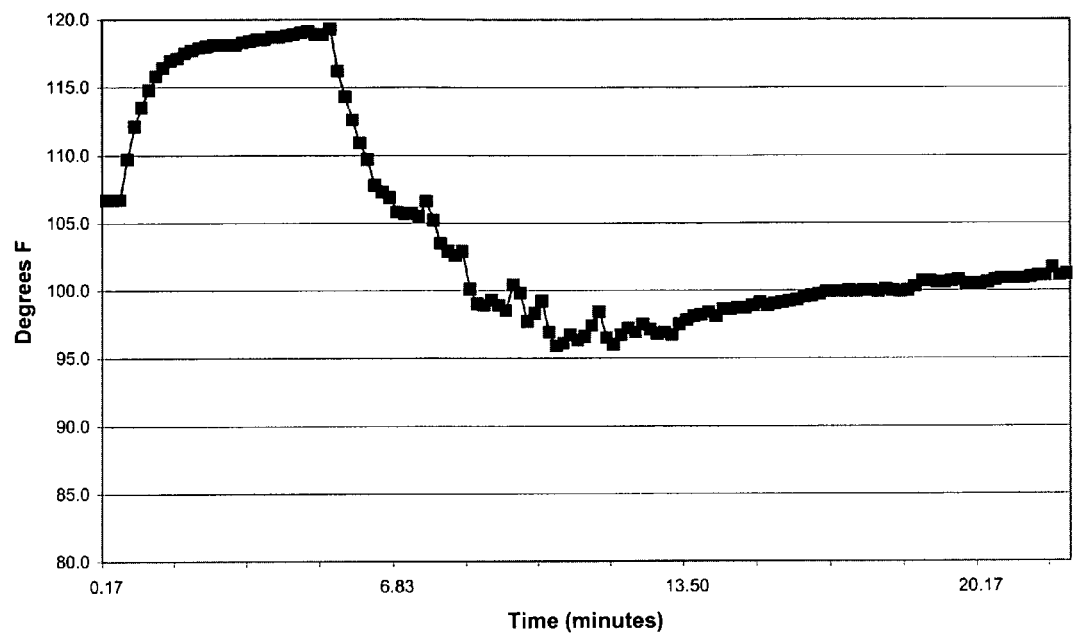
FIG. 8 is a chart of the live well without the vent air temperature over a period of time.
Figure 9:
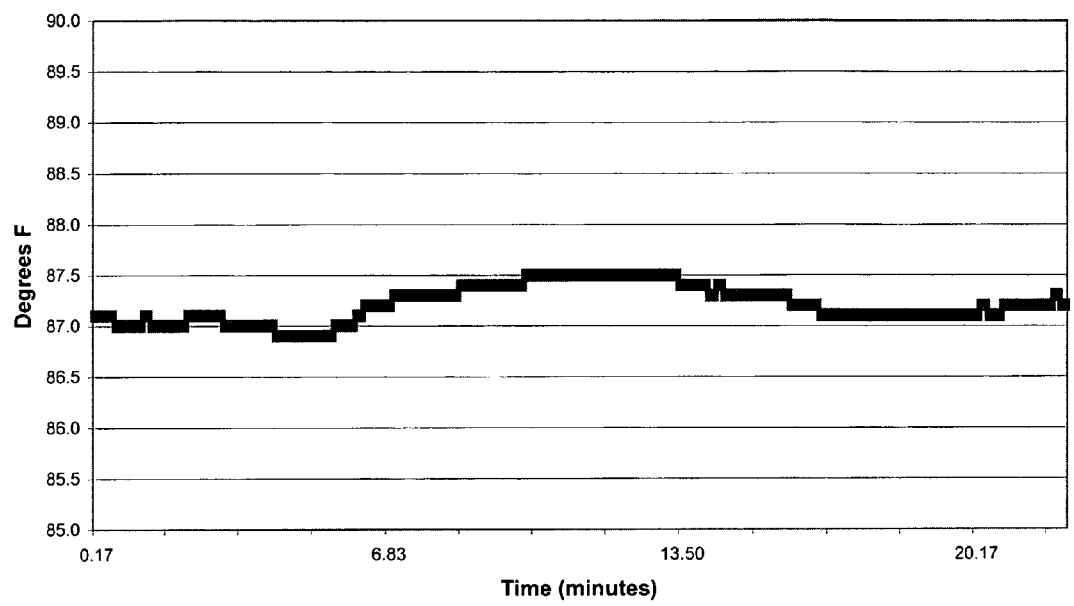
FIG. 9 is a chart of the live well with the vent water temperature over a period of time.
Figure 10:
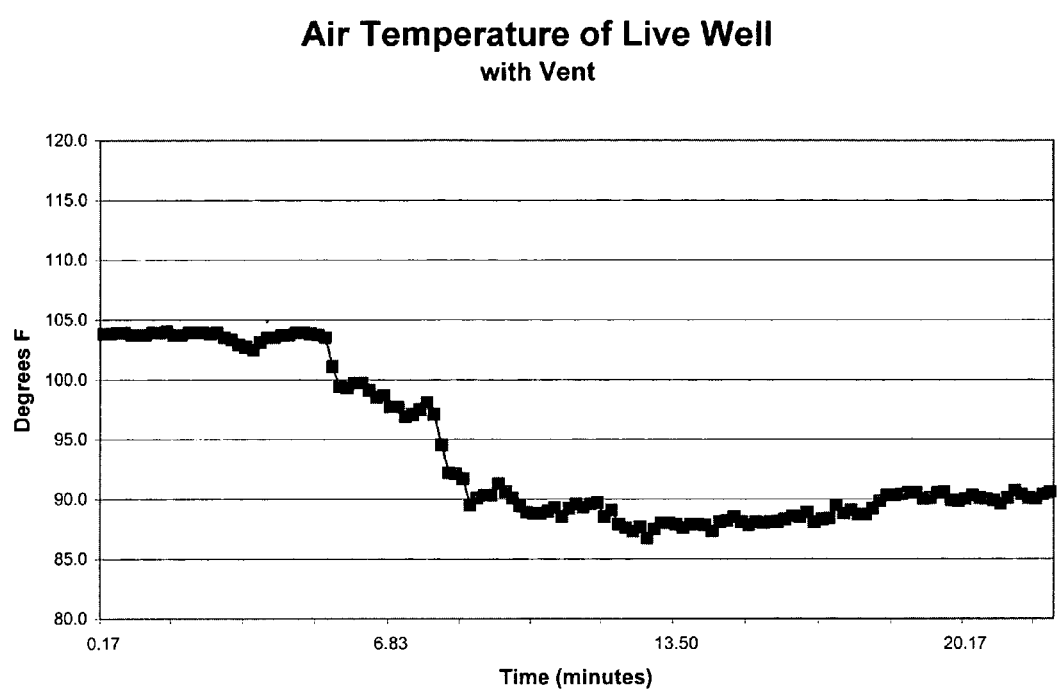
FIG. 10 is a chart of the live well with the vent air temperature over a period of time.

An experiment was conducted to demonstrate the performance of the live well with the described vent. FIGS. 7-10 provide air and water temperature readings over a set period of time. The live well without the vent is used as the control. All variables with the exception of the live well water and air temperature are considered constant. These variables can include the time of day, air temperature, wind velocity, wind direction, lake water temperature, oxygen level of lake, water turbidity, gallons of water in livewell, aeration, number of fish being held, construction materials of boat, speed of boat, etc. FIG. 7 and FIG. 8 show a rise in the air temperature of the live well without the vent which results in a slight increase in the water temperature. The air temperature then decreases and the water temperature decreases as well. FIG. 9 and FIG. 10 show that the air temperature of the live well with the vent decreases and the water temperature virtually stays the same. Other observations made during this test include: higher wind velocities decreased the air temperature in the vented live well, the vent live well was able to keep both temperature of the well and water more consistent to environmental conditions, and running the boat at extended periods cooled air temperature to ambient temperature and slowly decreased the water temperature.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A live well vent unit for a boat comprising:
   an integral one piece ventilation vent comprising a vertically disposed open ended elongated sleeve projecting thorough a live well lid means said sleeve including a bottom end and an upper end, said top end including a mounting flange projection outwardly beyond the outer perimeter of a distal end of said top end of said sleeve;
   a partition extending a selected length from said top end of said sleeve dividing at least a portion of an interior of said sleeve into a first inward air flow passage and a second opposing outward air flow passage through said sleeve;
   baffle means extending from the partition and overlying a portion of said respective passages;
   said baffle means slopes upwardly and outwardly away from the partition and terminates in a free outer edge spaced a selected distance from the adjacently disposed end of the sleeve, said free outer edge of said baffle spaced vertically from said upper end of said sleeve catching and deflecting any level of air from any direction traveling over said ventilation unit providing a current of fresh air into said first inward air flow passage and into said live well circulating above the water held therein decreasing the water temperature and increasing the dissolved oxygen level in said water and being pulled out through said second opposing outward air flow passage via a venturi effect.

2. The live well vent unit as defined in claim 1 wherein said sleeve is circular and wherein the space between the baffle and interior of the sleeve defines a crescent shaped air flow through opening in each of the air flow passages.

3. A fishing boat having a live well for holding a selected volume of water, a cover over said well separating the same from atmosphere and a live well vent unit comprising a vertically disposed open ended elongate sleeve mounted on said cover and projecting there through, said sleeve including a bottom end and an upper end, said top end including a mounting flange projecting outwardly beyond the outer perimeter of a distal end of said top end of said sleeve a partition dividing the interior of said sleeve into first inward and second separate outward vertical air flow passages, baffle means extending from said partition and overlying a portion of the respective passages exposed to atmosphere, said baffle means slopping upwardly and outwardly away from the partition and terminating in a free outer edge spaced a selected distance from the adjacently disposed end of the sleeve, said free outer edge of said baffle spaced vertically from said upper end of said sleeve catching and deflecting any level of air from any direction traveling over said ventilation unit providing a current of fresh air into said first inward air flow passage and into said live well circulating above the water held therein decreasing the water temperature and increasing the dissolved oxygen level in said water and being pulled out through said second opposing outward air flow passage via a venturi effect.

4. The live well vent unit of claim 1, wherein said sleeve is circular and the space between said baffle and an interior of said sleeve defines a crescent shaped air flow through opening in each of said air flow passages.

5. The live well vent unit of claim 1, wherein said lid comprises a portion of the deck closing the upper part of the live well.

6. The live well vent unit of claim 1, wherein said mounting flange extending radially outwardly from an upper end of said sleeve comprises a butterfly shaped vent unit.

7. The live well vent unit of claim 1, said baffle diverging upwardly away from said partition and having a curving outer edge having at it highest point a distance of 0.14 inches.

8. The live well vent unit of claim 1, said baffle diverging upwardly away from said partition and having a curving outer edge extending upward a selected distance to facilitate deflecting moving air currents there through.

9. The live well vent unit as defined in claim 3 wherein said sleeve is circular and wherein the space between the baffle and interior of the sleeve defines a crescent shaped air flow through opening in each of the air flow passages.

10. The live well vent unit of claim 3, wherein said sleeve is circular and the space between said baffle and an interior of said sleeve defines a crescent shaped air flow though opening in each of said air flow passages.

11. The live well vent unit of claim 3, wherein said lid comprises a portion of the deck closing the upper part of the live well.

12. The live well vent unit of claim 3, wherein said mounting flange extending radially outwardly from an upper end of said sleeve comprises a butterfly shaped vent unit.

13. The live well vent unit of claim 3, said baffle diverging upwardly away from said partition and having a curving outer edge having at it highest point a distance of 0.14 inches.

14. The live well vent unit of claim 1, said baffle diverging upwardly away from said partition and having a curving outer edge extending upward a selected distance to facilitate deflecting moving air currents there through.

* * * * *